United States Patent
Mohideen et al.

(10) Patent No.: US 7,395,400 B2
(45) Date of Patent: Jul. 1, 2008

(54) ADAPTIVE ADDRESS SPACE OPERATING SYSTEM

(75) Inventors: Saleem Mohideen, Saratoga, CA (US); Manish Ahluwalia, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 575 days.

(21) Appl. No.: 10/945,401

(22) Filed: Sep. 20, 2004

(65) Prior Publication Data
US 2006/0064562 A1 Mar. 23, 2006

(51) Int. Cl.
*G06F 12/10* (2006.01)
(52) U.S. Cl. .................. 711/170; 711/202; 711/203
(58) Field of Classification Search .......... 711/170, 711/203
See application file for complete search history.

(56) References Cited

U.S. PATENT DOCUMENTS

| 4,500,952 | A | * | 2/1985 | Heller et al. | 711/206 |
| 4,521,846 | A | * | 6/1985 | Scalzi et al. | 711/209 |
| 5,220,669 | A | * | 6/1993 | Baum et al. | 718/108 |
| 7,149,873 | B2 | * | 12/2006 | Mohideen et al. | 711/212 |
| 2006/0026384 | A1 | * | 2/2006 | Brandt et al. | 711/209 |

* cited by examiner

*Primary Examiner*—Matt Kim
*Assistant Examiner*—Hetul Patel

(57) ABSTRACT

In an embodiment, a method for an adaptive address space operating system, includes: selecting a first model of the address space layout for a process; attempting to perform an operation within a virtual address; determining if the operation can be performed successfully based on the first model or based upon a second model; if the operation cannot be performed successfully based upon the first model but can be performed successfully based upon the second model, then converting the address space layout from the first model to the second model; and performing the operation.

36 Claims, 5 Drawing Sheets

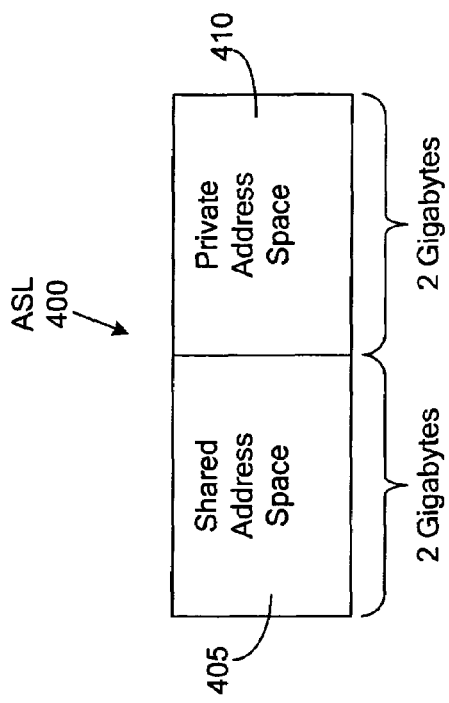
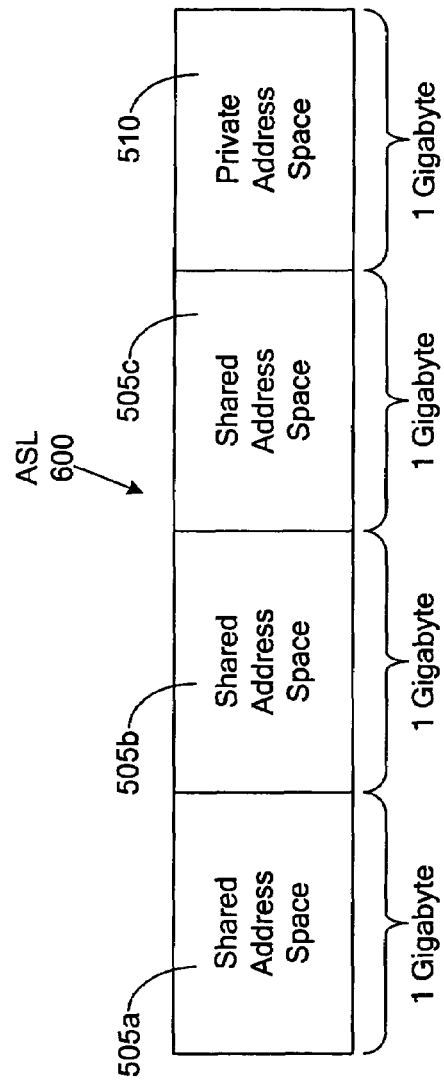

ADAPTIVE ADDRESS SPACE OPERATING SYSTEM

TECHNICAL FIELD

Embodiments of the present invention relate generally to operating systems for computers, and relate more particularly to an adaptive address space operating system.

BACKGROUND

An address space refers to a range of either physical or virtual addresses that are accessible to a processor or reserved for a process. A process is an instance of a program (application) running in a computer. On a computer, each process is allocated address space, which is some portion of the processor's address space.

Current and previous operating systems have only one address space model that is provided to the application developers. Current or previous operating systems either have the "single address space model" or the "multiple address space model". In the single address space model, an entire machine or computer has one address space that all applications use. In the multiple address space model, each process running on the computer has its own address space. For the application writer, the single address space model has better performance, but less flexibility, than the multiple address space model.

Furthermore, in previous approaches, since an operating system supports only the single address space model or the multiple address space model, an application may fail during operation because there is no algorithm to adapt an address space layout of a process in order to provide flexibility for the process or improve performance of the application.

Thus, the current approaches and/or technologies are limited to particular capabilities and/or suffer from various constraints or deficiencies.

SUMMARY OF EMBODIMENTS OF THE INVENTION

In an embodiment of the invention, a method for an adaptive address space operating system, includes: selecting a first model of the address space layout for a process; attempting to perform an operation within a virtual address; determining if the operation can be performed successfully based on the first model or based upon a second model; if the operation cannot be performed successfully based upon the first model but can be performed successfully based upon the second model, then converting the address space layout from the first model to the second model; and performing the operation.

In another embodiment of the invention, a method for adaptive address space operating system, includes: selecting a first model of the address space layout for a process; attempting to perform an operation within a virtual address; determining if the operation can be performed successfully based on the first model or by changing a chunk in the address space layout into a second model; if the operation cannot be performed successfully based upon the first model but can be performed successfully by changing the chunk into the second model, then converting the chunk into the second model; and performing the operation.

In another embodiment of the invention, an apparatus for an adaptive address space operating system, includes: a processor; and an operating system that can be executed by the processor, where the operating system is configured to select a first model of the address space layout for a process, permit an application to attempt to perform an operation within a virtual address, determine if the operation can be performed successfully based on the first model or based upon a second model, if the operation cannot be performed successfully based upon the first model but can be performed successfully based upon the second model, then convert the address space layout from the first model to the second model, and permit the application to perform the operation.

In another embodiment of the invention, an apparatus for adaptive address space operating system, including: a processor; and an operating system that can be executed by the processor, where the operating system is configured to select a first model of the address space layout for a process, permit an application to attempt to perform an operation within a virtual address, determine if the operation can be performed successfully based on the first model or by changing a chunk in the address space layout into a second model, if the operation cannot be performed successfully based upon the first model but can be performed successfully by changing the chunk into the second model, then convert the chunk into the second model; and permit the application to perform the operation.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

FIG. 4 is a block diagram of an address space layout, as used in a method of an embodiment of the invention.

FIG. 6 is a block diagram of an address space layout, as used in a method of an embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
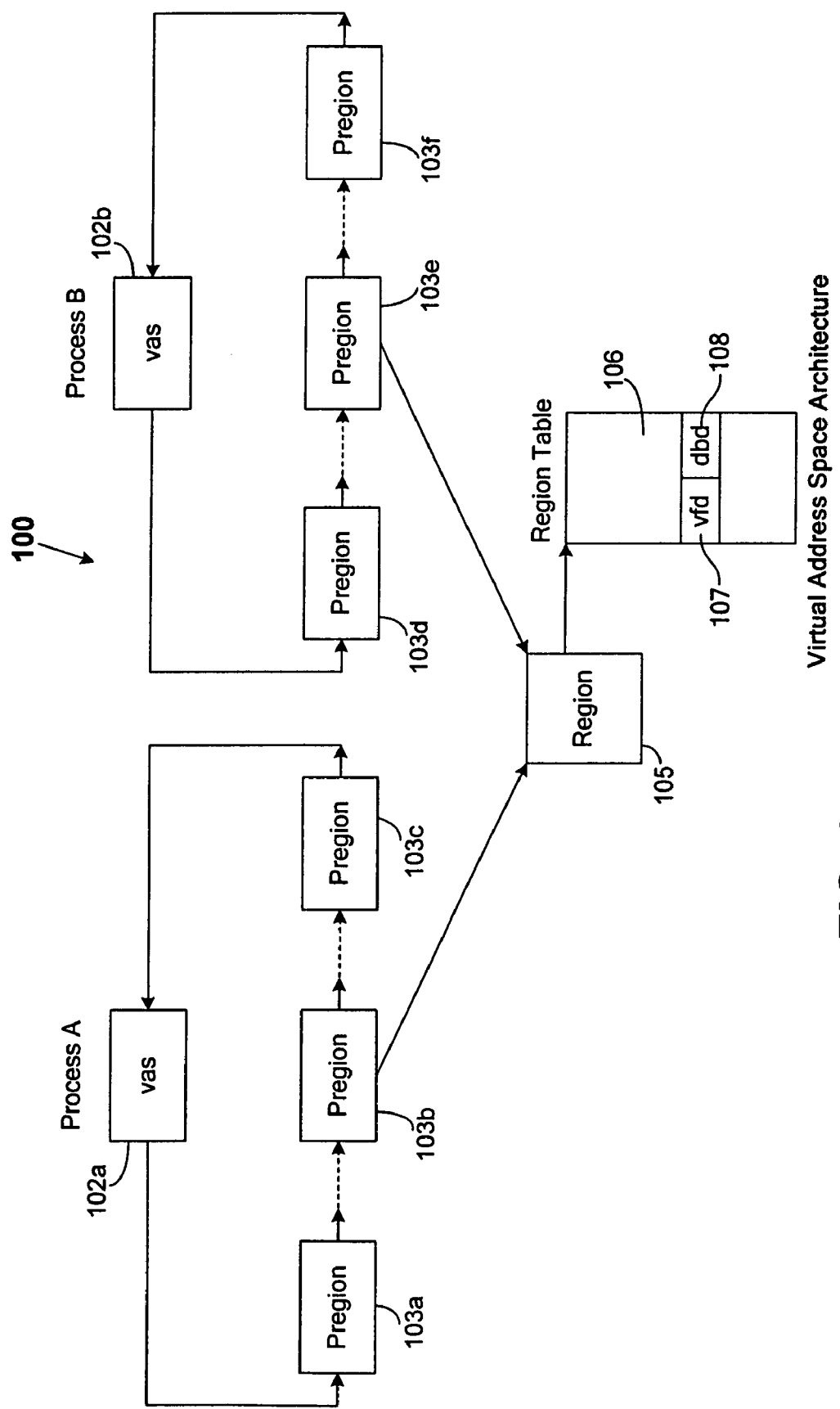
FIG. 1 is a block diagram of a virtual address space architecture that can function with an embodiment of the invention.

FIG. 1 is a block diagram of a virtual address space architecture 100 that can function with an embodiment of the invention. The virtual address space architecture 100 typically operates in a computer hardware environment. Each process (e.g., Process A and Process B) contains a vas structure (e.g., vas structures 102a and 102b). Each vas (virtual address space) structure has a linked list of user mappings. The user mappings are represented by the pregion structures (e.g., pregion structures 103a to 103f). A pregion structure (generally referred to as pregion 103) contains a pointer to a memory object and an address of the mapping to that memory object. The memory object is represented by the region structure 105. The region structure 105 stores a region table 106 that maps the memory object to a physical address and backing store. The backing store could be one of anonymous, file or swap. Each entry in the region table 106 contains a vfd 107 and dbd 108. The vfd 107 contains the physical address in memory and the dbd 108 contains the location in the backing store.

The pregion structure 103 can be represented as a <vaddr, region offset> tuple and the region structure 105 can be represented as a <region offset, pfn> tuple. A translation is created by combining the two tuples to form the <vaddr, pfn> tuple. As known to those skilled in the art, in programming languages, such as LISP, Python, Linda, and others, a "tuple" is an ordered set of values. The separator for each value is often a comma (depending on the rules of the particular language). Common uses for the tuple as a data type are (1) for passing a string of parameters from one program to another, and (2) representing a set of value attributes in a relational database. In some languages, tuples can be nested within other tuples within parentheses or brackets or other delimiters. Tuples can contain a mixture of other data types.

The virtual memory currently uses a non-aliased shared memory model to share memory. All processes that map a shared memory segment (a memory mapped file or system virtual shared memory) will use the same global address. In other words, the virtual address in the pregion 103 for all processes that share the same memory segment will be identical.

To support MPAS (mostly private address space) executables, an aliased shared memory model is typically necessary. All MPAS processes that map a shared memory segment will use a private address. In this case, the address in the pregion will be different from other pregions. One example of a method and apparatus for supporting the MPAS model and MGAS (mostly global address space) model is disclosed in commonly-assigned U.S. patent application Ser. No. 10/692,981, entitled "METHODS and APPARATUS FOR A DUAL ADDRESS SPACE OPERATING SYSTEM" by Saleem Mohideen and Manish Ahluwalia, which is hereby fully incorporated herein by reference.

Figure 2:
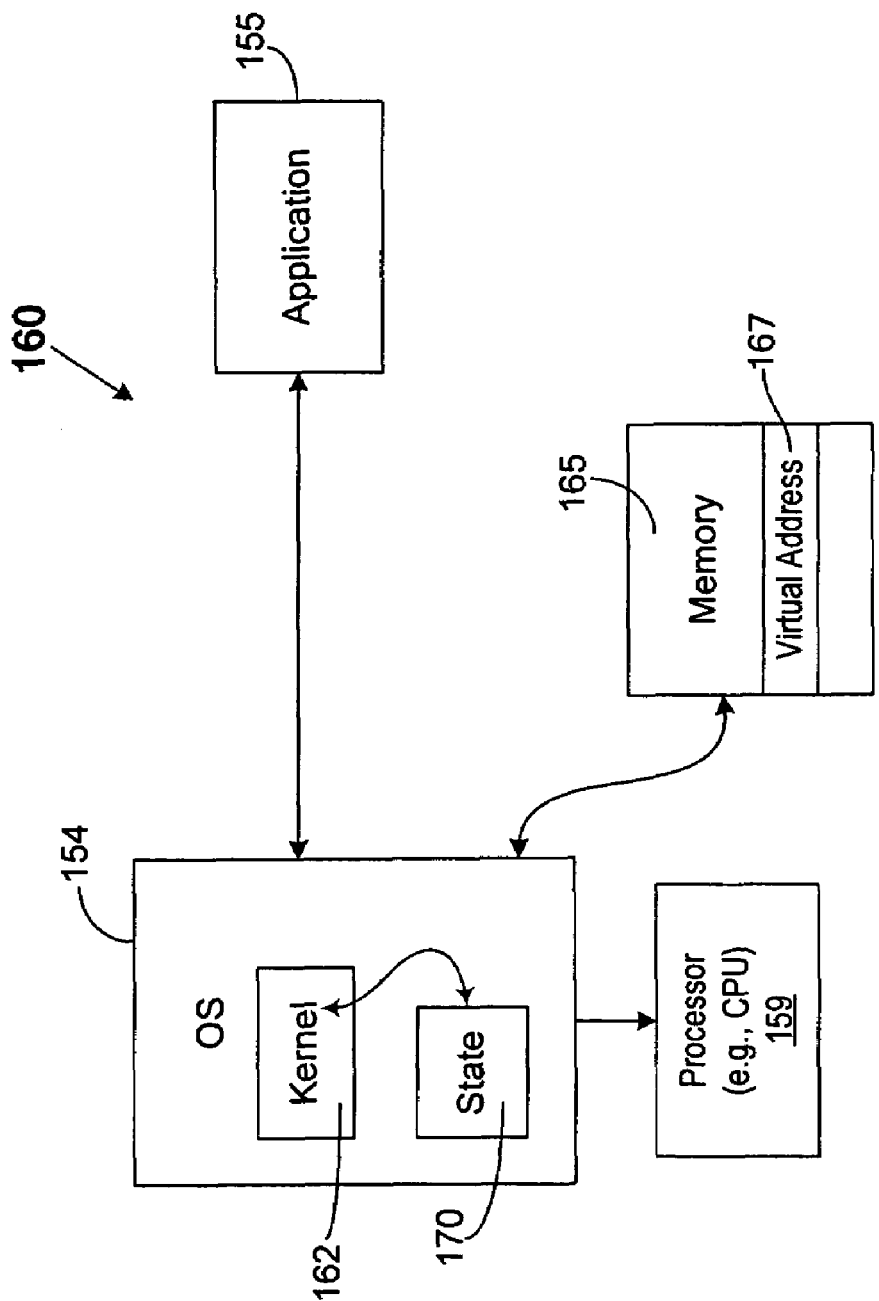
FIG. 2 is a block diagram of an adaptive address space operating system, in accordance with an embodiment of the invention.

In an embodiment of the invention, a processor (e.g., CPU) 159 will execute an operating system (OS) 154 and other software in the computer 160. The operating system 154 manages the applications 155 that will run in the computer 160. The operating system 154 includes a kernel 162 which is the operating system's inmost layer or core of services. Typically, the kernel 162 includes a manager of the operating system's 154 address spaces in memory or storage 165, so that the address spaces are shared among all components and other users of the services of the kernel 162. Other known software and hardware components in the computer 160 are not shown in FIG. 2, for purposes of describing the functionality of embodiments of the invention.

In an embodiment of the invention, an application developer is not required to specify the type of address space model to be used by the application 155. The operating system 154 selects which address space model to use for a process of the application 155 and can dynamically change the address space model of the process, as discussed in detail below. Therefore, an embodiment of the invention can provide various advantages. First, an embodiment of the invention provides application developers complete flexibility over choice of address space models, without the requirement of determining which address space model best suits the needs of the application 155. Second, the kernel 162 can dynamically adapt an address space layout of a process, in order to trade off performance, virtual memory pressure, and control of the application 155 over the address space.

In an embodiment of the invention, the kernel 162 is configured to dynamically select or adapt an address space layout of a process for an application 155, in order to meet the requirements of the application 155 and prevent failure of the application 155 during operation. As known to those skilled in the art, an address space layout comprises an address space of a process. The address space refers to the range of virtual addresses that are accessible by the process. A 32 bit application will have a 32 bit address space and a 64 bit application will have a 64 bit address space. An address space is composed of a private address space and a shared address space.

As known to those skilled in the art, a private address space is an address space that is available only to a single process. In other words, a private address space is within the exclusive control of the process. This means that a process can expect that another process will not consume its private address space. Except for rare cases, a process can expect that its private address space is not accessible to other processes. In a current implementation (but not a limitation in other embodiments), a private address space can contain only private objects (with the exception of exclusive, shared mappings) of applications. A private object is an object that is mapped only by one process and is not shared with other processes. Examples of a private object include, data, stack, and other types objects.

As known to those skilled in the art, shared objects of applications will reside in a global (shared) address space. Shared objects will be placed in the private address space when there is no space available in the shared address space. A shared object is an object that can be mapped by one or more processes. Examples of a shared object include, system Virtual shared memory, file, and other types of shared objects. A shared address space is not entirely within the control of the process. The shared address space is global to the entire system. The shared address space may be visible to other processes. Accessing the address in a global address space is protected by using protection keys (called protection IDs in the HP-PA architecture). The term "global virtual address" is used to denote the combination of address space identifier (ASID) and virtual address (or offset) that is used by the computer hardware to access a virtual memory location. The address space is called "space ID" in the HP-PA architecture (Hewlett-Packard's range of RISC processors) and is called "region ID" in Intel's Itanium architecture. As an example, consider 32 bit processes. Each process has an address space that ranges from 0x00000000 to 0xFFFFFFFF. However, the same virtual address within two (2) processes may map to different global virtual addresses, depending on the value of the corresponding region registers.

The term "virtual address" means the 32 bit or 64 bit address (for a 32 bit process or 64 bit process, respectively) that is generated within the context of or on behalf of a process. The entire range of virtual addresses that can be generated constitutes the virtual address space (also referred herein as "address space") of a process.

Figure 3:
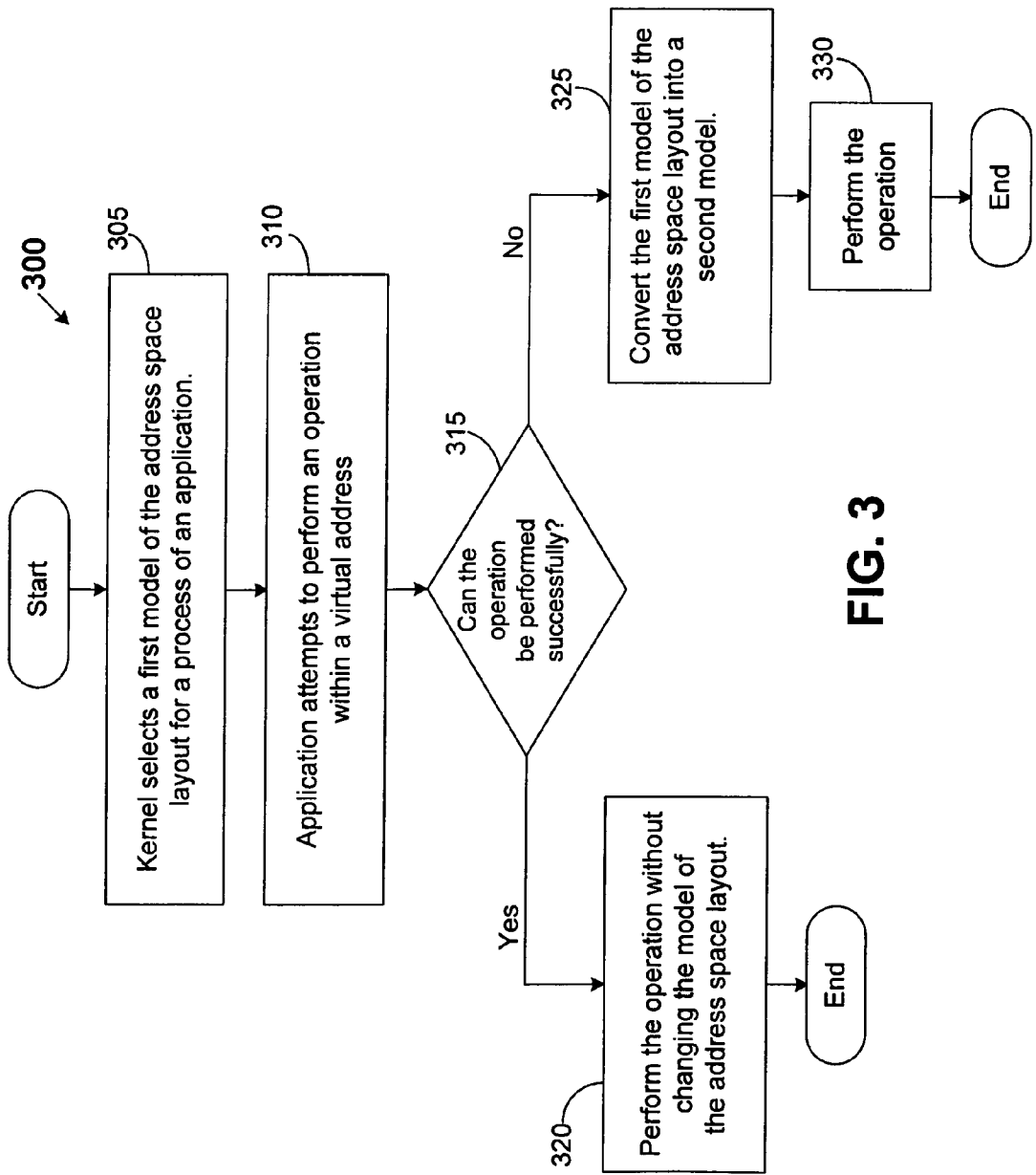
FIG. 3 is a flowchart of a generic method for dynamically changing the model of address space layout for a process of an application, in accordance with an embodiment of the invention.

FIG. 3 is a flowchart of a generic method 300 for dynamically changing the model of address space layout for a process of an application 155 (i.e., generic method for an adaptive address space operating system), in accordance with an embodiment of the invention. The application 155 can be a 32-bit or 64-bit application. In block 305 of method 300, assume that the kernel 162 selects a first model (e.g., MGAS) of the address space layout for a process of an application 155. Note also that the address space layout for 64-bit and 32-bit (and MGAS and MPAS) will differ, as shown in the above-cited U.S. patent application Ser. No. 10/692,981. Typically, the kernel 162 will select a model that offers good performance (e.g., speed) for the application 155. In block 310, the application attempts to perform an operation within a virtual address (e.g., virtual address 167 in FIG. 2). The term "virtual address" means the 32 bit or 64 bit address (for a 32 bit process or 64 bit process, respectively) that is generated within the context of or on behalf of a process.

In block 315, the kernel 162 determines if the operation can be performed successfully based on the first model. If so, then in block 320, the application performs the operation and the kernel does not change the model of the address space layout, and the method 300 then ends.

On the other hand, if in block 315, the kernel 162 determines that the operation will not be performed successfully based on the first model, and also determines that the operation can be performed successfully based on a second model, then the method 300 proceeds to block 325. Therefore, the kernel 162 can dynamically determine the appropriate model of the address space layout for the application.

It is also noted that in block 315, the kernel 162 determines if the operation can or cannot be performed based upon the address space layout model of the process and based upon the type of the operating system 154. The operating system 154 can be a multiple address space operating system (MAS OS) which is an operating system that uses a unique address space for each process. The operating system 154 can also be a single address space operating system (SAS OS) which is an operating system that uses a global address space for all processes.

In block 325, the kernel 162 will convert the address space layout from the first model to the second model. In block 330, the application performs the operation, and the method 300 then ends.

Specific examples of the method 300 are now discussed. In a first example, assume that the first model is the MGAS model and the second model is the MPAS model. Therefore, in block 305, the kernel 162 selects the MGAS model for the address space layout. In block 310, the application attempts to map a private object to the virtual address 167.

Assume that when the application was launched, the kernel 162 had chosen the virtual address 167 (FIG. 1) as a shared address space for the application. In block 315, the kernel 162 determines that the private object will not successfully map to the virtual address 167 because the virtual address 167 is a shared address space. A shared address space is an address space that is shared among processes and can contain only shared objects. However, in block 315, the kernel 162 also determines that the private object can be mapped to the virtual address 167 if the address space layout was converted to the MPAS model and virtual address 167 is thus converted into a private address space. Therefore, in this example, the method 300 will proceed to block 325.

In block 325, the kernel 162 will convert the address space layout from the MGAS model to the MPAS model. In the MGAS model, shared objects will reside in a global address space. In the MPAS model, both shared objects and private objects will reside in the private address space by default. When the address space layout is converted into the MPAS model, the virtual address 167 is converted into a private address space, and the application can now map the private object into the virtual address 167.

In block 330, the application successfully performs the operation by mapping the private object into the virtual address 167, and the method 300 then ends.

In a second example, assume that the first model is the MGAS model and the second model is the MPAS model. Therefore, in block 305, the kernel 162 selects the MGAS model for the address space layout. As an example, the address space layout 400 (FIG. 4) will have a shared address space 405 of approximately 2 gigabytes and a private address space 410 to approximately 2 gigabytes. It is assumed in this example that this allocation of private address space and shared address space provides efficient performance. However, the private address space and shared address space can be allocated to other values.

In block 310, assume that the application is currently using the entire 2 gigabytes of private address space 410 for heap space and will also require, for example, approximately 100 megabytes of additional heap space. As known to those skilled in the art, heap space is obtained from a private address space and is an area of memory that a program process can use to store data in some variable amount that will not be known until the program is running. For example, a program may accept different amounts of input from one or more users for processing and then perform the processing on all the input data at once. Having a certain amount of heap space already obtained from the operating system makes it easier for the process to manage storage and is generally faster than asking the operating system for storage every time storage area is needed. The process manages its allocated heap by requesting a "block" of the heap when needed, returning the blocks when the blocks are no longer needed. The hardware architecture of the computer will influence the size of the heap block.

In block 315, the kernel 162 determines that the kernel can not give the 100 megabytes of requested heap space for the application because there no available private address space 410. However, in block 315, the kernel 162 also determines that the 100 megabytes of requested heap space can be given to the application if the address space layout 400 was converted to the MPAS model, and as a result, additional private address space will be available for the 100 megabytes of requested heap space. Therefore, in this example, the method 300 will proceed to block 325.

In block 325, the kernel 162 will convert the address space layout 400 from the MGAS model to the MPAS model, in order to obtain more flexibility (i.e., in order to be able to perform the operation). When the address space layout 400 is converted into the MPAS model, the kernel 162 can now provide to the application the 100 megabytes of requested heap space from the additional private address space that resulted from the MGAS model to MPAS model conversion. As an example, most (or all) of the 2 gigabytes shared address space 405 will be converted by the kernel 162 into a private address space. This private address space is available for the application as heap space.

In block 330, the application successfully performs the operation, where the kernel 162 will provide the 100 megabytes of requested heap space to the application, and the method 300 then ends.

It is noted that if the kernel 162 determines in block 315 that the operation cannot be performed successfully by changing the model of the address space layout 400, then kernel 162 will not change the address space layout model and will permit the operation to fail. For example, if the application is currently using 2 gigabytes of private address space 410 and is requesting approximately 3 gigabytes of heap space, then the kernel 162 will not change the model of the address space layout 400 from MGAS to MPAS because there is insufficient private address space available for the 3 gigabytes of requested heap space, and will permit the operation to fail.

In a third example, assume that the first model is the MPAS model and the second model is the MGAS model. Therefore, in block 305, the kernel 162 selects the MPAS model for the address space layout. As an example, the address space layout 400 (FIG. 4) will have a shared address space 405 of approximately 2 gigabytes and a private address space 410 to approximately 2 gigabytes. However, the private address space and shared address space can be allocated to other values.

In block 310, assume that the application is not currently using the entire 2 gigabytes of private address space 410 for heap space. As a result, in block 315, the kernel 162 determines that the application can give up 2 gigabytes of private address space 410, and determines that the model of the address space layout 400 can be converted from MPAS to MGAS without affecting any operations. Therefore, in this example, the method 300 will proceed to block 325.

In block 325, the kernel 162 will convert the address space layout 400 from the MPAS model to the MGAS model, in order to obtain improved performance. When the address space layout 400 is converted into the MGAS model, most (or all) of the 2 gigabytes private address space 410 will be converted by the kernel 162 into a shared address space.

In block 330, the application successfully performs the operation, where the kernel 162 will obtain unused heap space from the application, and the method 300 then ends.

Figure 5:
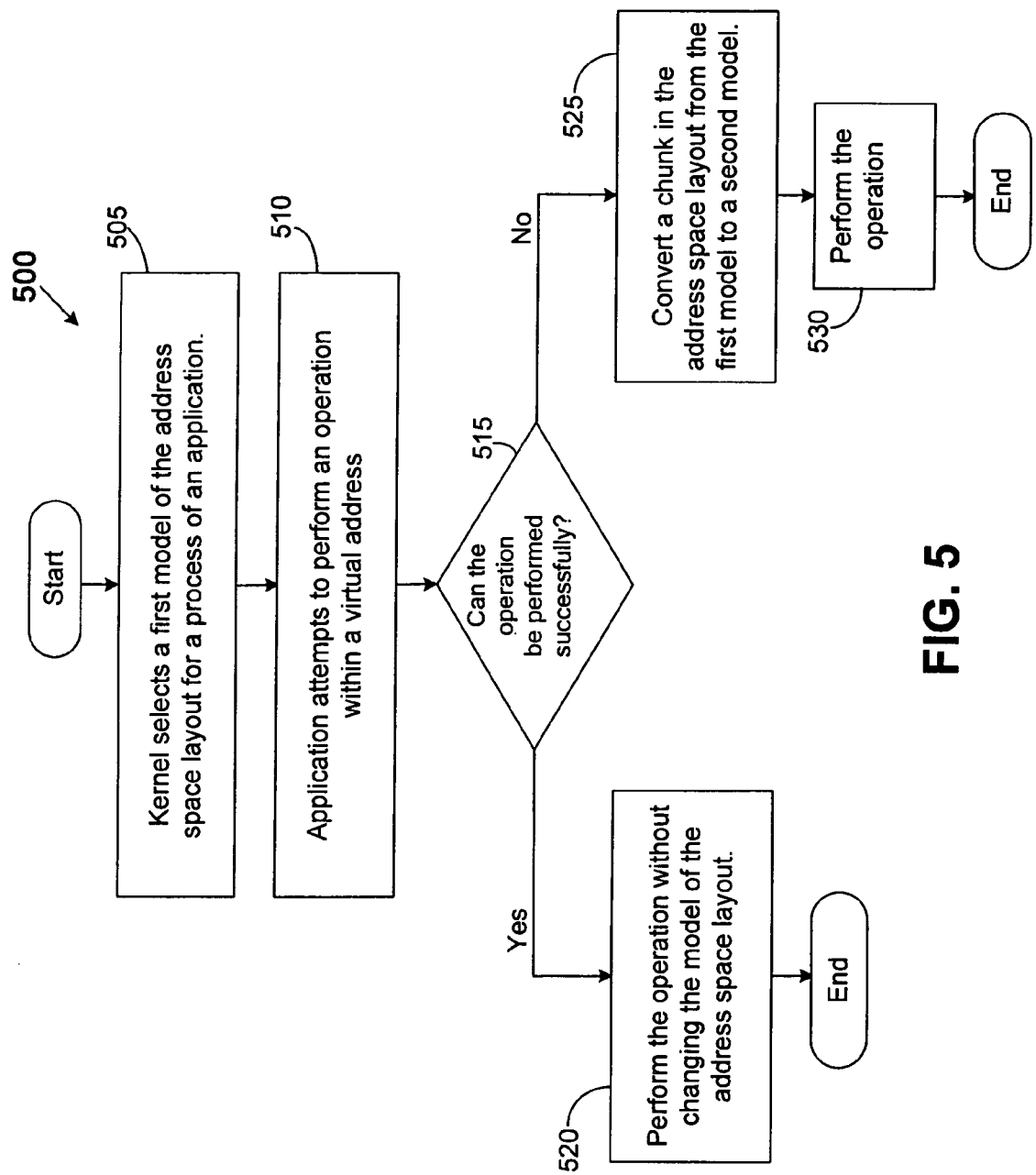
FIG. 5 is a flowchart of a generic method for dynamically changing the model of address space layout for a process of an application, on a chunk-by-chunk basis, in accordance with an embodiment of the invention.

FIG. 5 is a flowchart of a generic method 500 for dynamically changing the model of address space layout for a process of an application, on a chunk-by-chunk basis (i.e., generic method for an adaptive address space operating system), in accordance with an embodiment of the invention. As discussed herein, a chunk may be, for example, an octant, a quadrant, or segment, depending on the architecture of the computer system 160 as provided by the particular vendor.

In block 505 of method 500, assume that the kernel 162 selects a first model (e.g., shared address space) of the address space layout for a process of an application 155. Typically, the kernel 162 will select a model that offers good performance (e.g., speed) for the application 155. In block 510, the application attempts to perform an operation within a virtual address (e.g., virtual address 167 in FIG. 2).

In block 515, the kernel 162 determines if the operation can be performed successfully based on the first model. If so, then in block 520, the application performs the operation and the kernel does not change the model of the address space layout, and the method 300 then ends.

On the other hand, if in block 515, the kernel 162 determines that the operation will not be performed successfully based on the first model, and also determines that the operation can be performed successfully by changing a chunk of the address space layout into a second model, then the method 500 proceeds to block 525.

In block 525, the kernel 162 will convert a chunk in the address space layout from the first model to the second model. The second model can be, for example, a private address space. In block 530, the application performs the operation, and the method 300 then ends.

Specific examples of the method 500 are now discussed. In a first example, assume in block 505, that the kernel 162 selects the following models for chunks in the address space layout 600. Chunks 505a, 505b, and 505c will each be a shared address space of approximately 1 gigabyte. Chunk 510 will be a private address space of approximately 1 gigabyte. It is assumed in this example that this allocation of private address space and shared address space provides efficient performance. However, the private address space and shared address space can be allocated to other values.

In block 510, assume that the application is currently using the entire 1 gigabyte of private address space in chunk 510 for heap space and will also require, for example, approximately 100 megabytes of additional heap space. As mentioned above, heap space is obtained from a private address space.

In block 515, the kernel 162 determines that the kernel can not give the 100 megabytes of requested heap space for the application because there is no available private address space in the address space layout 600. However, in block 515, the kernel 162 also determines that the 100 megabytes of requested heap space can be given to the application if one of the three chunks 505a-505c is converted into a private address space. In contrast, note that for an MGAS and MPAS process, all three chunks 505a-505c would be converted into a private address space when an address space layout is converted to MPAS. In this example, the method 500 will proceed to block 525.

In block 325, the kernel 162 will convert one of the three chunks 505a-505c to a private address space. Assume that chunk 505a is converted into a private address space. When the chunk 505a in the address space layout 600 is converted into a private address space, the kernel 162 can now provide to the application the 100 megabytes of requested heap space.

In block 530, the application successfully performs the operation, where the kernel 162 will provide the 100 megabytes of requested heap space to the application, and the method 300 then ends.

If additional heap space is needed and there is no available private address space in the address space layout 600, then one of the chunks 505b-505c are converted by the kernel 162 into a private address space. This private address space permits the kernel 162 to provide the needed additional heap space.

It is noted that if the kernel 162 determines in block 515 that the operation cannot be performed successfully by converting a chunk in the address space layout 600, then kernel 162 will not convert a chunk in the address space layout 600 and will permit the operation to fail.

In a second example, assume in block 505, that the kernel 162 selects the following models for chunks in the address space layout 600. Chunks 505a, 505b, and 505c will each be a shared address space of approximately 1 gigabyte. Chunk 510 will be a private address space of approximately 1 gigabyte. It is assumed in this example that this allocation of private address space and shared address space provides efficient performance. However, the private address space and shared address space can be allocated to other values.

In block 510, assume that the application is not currently using the entire 1 gigabyte of private address space of chunk 510 for heap space. As a result, in block 515, the kernel 162 determines that the application can give up the 1 gigabyte of private address space in chunk 510, without affecting any operations. Therefore, in this example, the method 500 will proceed to block 525.

In block 525, the kernel 162 will convert the chunk 510 from a private address space to a shared address space, in order to obtain improved performance.

In block 530, the application successfully performs the operation, where the kernel 162 will obtain unused heap space from the application, and the method 500 then ends.

As mentioned above, the hardware architecture will influence the size of a chunk (i.e., the hardware architecture will influence the granularity of the conversion of portions of the address space layout 600). The kernel 162 will partition the address space in memory and perform the conversion of a chunk. The kernel 162 can then map the objects for the application 155 in the appropriate address spaces in memory, as previously discussed above.

When the kernel 162 converts a chunk, the kernel 162 will modify state data (e.g., state data 170 in FIG. 1) that is associated with the chunk to be converted. Each chunk will have an associated state data 170. Each process will have an associated set of state data. When the kernel 162 converts an address space layout into a different model, the kernel 162 will modify the appropriate set of state data.

Table 1 is an algorithm to convert a chunk from a share address space to a private address space, in accordance with an embodiment of the invention. The mapping of the virtual address to a physical address is referred to as a "translation". A process is prevented from accessing an address that it has not mapped by not having a translation.

TABLE 1

- Allocate a new global "space ID" (address space) for the chunk (e.g., chunk is a quadrant in the HP-PA architecture from Hewlett-Packard Company). Each chunk must have a space ID. A chunk (used as a globally shared address space) has a global space ID used by all processes that are using that shared address space chunk. A chunk (which is a private address space) must have a space ID used only by a process that is using that private address space chunk.
- For each object that the process had mapped in this chunk:
    - if there are no other processes using the global space ID for this chunk to access this object
        - delete translations to this object
    - else
        - nothing
    - add the new translations for the object for this process (using the new space ID)
- Modify internal data for the process, identifying this chunk as private to the process.

The method of certain embodiments of the invention may typically be implemented in hardware, software, firmware, or a combination thereof. In one embodiment, the method is executed by software or firmware that is stored in a memory and that is executed by a suitable instruction execution system. If implemented in hardware, as in an alternative embodiment, the method can be implemented with any suitable technology that is well known in the art.

The various engines or modules discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for an adaptive address space operating system, the method comprising:
selecting a first model of the address space layout for a process;
attempting, by an application, to perform an operation within a virtual address space wherein the application will map an object to the virtual address space;
determining if the operation can be performed successfully based on the first model or based upon a second model;
if the operation cannot be performed successfully based upon the first model but can be performed successfully based upon the second model, then converting the address space layout from the first model to the second model, including converting a first address space type in said address space layout into a second address space type so that the operation can be performed;

wherein the first address space type comprises a shared address space if the second address space type comprises a private address space;

wherein the first address space type comprises the private address space if the second address space type comprises the shared address space; and performing the operation.

2. The method of claim 1, further comprising:

if the operation can be performed successfully, then performing the operation without changing the first model of the address space layout.

3. The method of claim 1, wherein the first model is one of a mostly global address space (MGAS) model and mostly private address space (MPAS) model.

4. The method of claim 1, wherein the second model is one of a mostly global address space (MGAS) model and mostly private address space (MPAS) model.

5. The method of claim 1, wherein the act of converting the address space layout comprises:

converting the address space layout from the MGAS model to the MPAS model to permit a private object to be mapped in the virtual address space.

6. The method of claim 1, wherein the act of converting the address space layout comprises:

converting the address space layout from the MGAS model to the MPAS model to permit the application to obtain heap space.

7. The method of claim 1, wherein the act of converting the address space layout comprises:

converting the address space layout from the MPAS model to the MGAS model to permit the application to give up private address space that is not used for heap space.

8. The method of claim 1, wherein the private address space is available for use by only a single process and the shared address space is available for use by multiple processes.

9. A method for adaptive address space operating system, the method comprising:

selecting a first model of the address space layout for a process;

attempting, by an application, to perform an operation within a virtual address space wherein the application will map an object to the virtual address space;

determining if the operation can be performed successfully based on the first model or by changing a chunk in the address space layout into a second model;

if the operation cannot be performed successfully based upon the first model but can be performed successfully by changing the chunk into the second model, then converting the chunk into the second model, including converting the chunk from a first address space type into a second address space type so that the operation can be performed;

wherein the first address space type comprises a shared address space if the second address space type comprises a private address space;

wherein the first address space type comprises the private address space if the second address space type comprises the shared address space; and performing the operation.

10. The method of claim 9, further comprising:

if the operation can be performed successfully, then performing the operation without changing the first model of the address space layout.

11. The method of claim 9, wherein the first model is one of a mostly global address space and a mostly private address space.

12. The method of claim 9, wherein the second model is one of a mostly global address space and a mostly private address space.

13. The method of claim 9, wherein the act of converting the address space layout comprises:

converting the chunk from a shared address space to a private address space to permit a private object to be mapped in the chunk.

14. The method of claim 9, wherein the act of converting the address space layout comprises:

converting the chunk from a shared address space to a private address space to permit the application to obtain heap space.

15. The method of claim 9, wherein the act of converting the address space layout comprises:

converting the chunk from a private address space to a shared address space to permit the application to give up private address space that is not used for heap space.

16. The method of claim 9, wherein the private address space is available for use by only a single process and the shared address space is available for use by multiple processes.

17. An article of manufacture, comprising:

a machine-readable medium having stored thereon instructions to:

select a first model of the address space layout for a process;

attempt, by an application, to perform an operation within a virtual address space wherein the application will map an object to the virtual address space;

determine if the operation can be performed successfully based on the first model or based upon a second model;

if the operation cannot be performed successfully based upon the first model but can be performed successfully based upon the second model, then convert the address space layout from the first model to the second model, including converting a first address space type in said address space layout into a second address space type so that the operation can be performed;

wherein the first address space type comprises a shared address space if the second address space type comprises a private address space;

wherein the first address space type comprises the private address space if the second address space type comprises the shared address space; and perform the operation.

18. The article of manufacture of claim 17 wherein the private address space is available for use by only a single process and the shared address space is available for use by multiple processes.

19. An apparatus for an adaptive address space operating system, the apparatus comprising:

a processor;

means for selecting a first model of the address space layout for a process;

means for attempting, by an application, to perform an operation within a virtual address space;

means for determining if the operation can be performed successfully based on the first model or based upon a second model;

means for converting the address space layout from the first model to the second model, if the operation cannot be performed successfully based upon the first model but can be performed successfully based upon the second model, including means for converting a first address space type in said address space layout into a second address space type so that the operation can be performed;

wherein the first address space type comprises a shared address space if the second address space type comprises a private address space;

wherein the first address space type comprises the private address space if the second address space type comprises the shared address space; and the processor performing the operation.

20. The apparatus of claim 19, wherein the private address space is available for use by only a single process and the shared address space is available for use by multiple processes.

21. An apparatus for an adaptive address space operating system, the apparatus comprising:

a processor; and an operating system that can be executed by the processor, where the operating system is configured to select a first model of the address space layout for a process, permit an application to attempt to perform an operation within a virtual address space wherein the application will map an object to the virtual address space, determine if the operation can be performed successfully based on the first model or based upon a second model, if the operation cannot be performed successfully based upon the first model but can be performed successfully based upon the second model, then convert the address space layout from the first model to the second model by converting a first address space type in said address space layout into a second address space type so that the operation can be performed, and permit the application to perform the operation;

wherein the first address space type comprises a shared address space if the second address space type comprises a private address space; and wherein the first address space type comprises the private address space if the second address space type comprises the shared address space.

22. The apparatus of claim 21, wherein the operating system permits the application to perform the operation without changing the first model of the address space layout, if the operation can be performed successfully.

23. The apparatus of claim 21, wherein the first model is one of a mostly global address space (MGAS) model and mostly private address space (MPAS) model.

24. The apparatus of claim 21, wherein the second model is one of a mostly global address space (MGAS) model and mostly private address space (MPAS) model.

25. The apparatus of claim 21, wherein operating system is configured to convert the address space layout by performing a method comprising:

converting the address space layout from the MGAS model to the MPAS model to permit a private object to be mapped in the virtual address space.

26. The apparatus of claim 21, wherein the operating system is configured to convert the address space layout by performing a method comprising:

converting the address space layout from the MGAS model to the MPAS model to permit the application to obtain heap space.

27. The apparatus of claim 21, wherein the operating system is configured to convert the address space layout by performing a method comprising:

converting the address space layout from the MPAS model to the MGAS model to permit the application to give up private address space that is not used for heap space.

28. The apparatus of claim 21, wherein the private address space is available for use by only a single process and the shared address space is available for use by multiple processes.

29. An apparatus for adaptive address space operating system, the apparatus comprising:

a processor; and an operating system that can be executed by the processor, where the operating system is configured to select a first model of the address space layout for a process, permit an application to attempt to perform an operation within a virtual address space, determine if the operation can be performed successfully based on the first model or by changing a chunk in the address space layout into a second model, if the operation cannot be performed successfully based upon the first model but can be performed successfully by changing the chunk into the second model, then convert the chunk into the second model by converting the chunk from a first address space type into a second address space type so that the operation can be performed; and permit the application to perform the operation;

wherein the first address space type comprises a shared address space if the second address space type comprises a private address space; and wherein the first address space type comprises the private address space if the second address space type comprises the shared address space.

30. The apparatus of claim 29, wherein the operating system is configured to permit the application to performing the operation without changing the first model of the address space layout, if the operation can be performed successfully.

31. The apparatus of claim 29, wherein the first model is one of a mostly global address space and a mostly private address space.

32. The apparatus of claim 29, wherein the second model is one of a mostly global address space and a mostly private address space.

33. The apparatus of claim 29, wherein the operating system is configured to convert the address space layout by a method comprising:

converting the chunk from a shared address space into a private address space to permit a private object to be mapped in the chunk.

34. The apparatus of claim 29, wherein the operating system is configured to convert the address space layout by a method comprising:

converting the chunk from a shared address space into a private address space to permit the application to obtain heap space.

35. The apparatus of claim 29, wherein the operating system is configured to convert the address space layout by a method comprising:

converting the chunk from a private address space into a shared address space to permit the application to give up private address space that is not used for heap space.

36. The apparatus of claim 29, wherein the private address space is available for use by only a single process and the shared address space is available for use by multiple processes.

* * * * *